United States Patent [19]

Ohtsubo et al.

[11] 4,316,660
[45] Feb. 23, 1982

[54] ALARM DEVICE IN AN AUTOMATIC EXPOSURE CAMERA

[75] Inventors: Yoshiakai Ohtsubo, Kawasaki; Sakuji Watanabe, Warabi, both of Japan

[73] Assignee: Nippon Kogaku K.K., Tokyo, Japan

[21] Appl. No.: 139,769

[22] Filed: Apr. 14, 1980

[30] Foreign Application Priority Data

May 1, 1979 [JP] Japan ................... 54-52472

[51] Int. Cl.$^3$ ..................... G03B 7/083; G03B 17/18
[52] U.S. Cl. ................................ 354/50; 354/60 E
[58] Field of Search ............. 354/53, 60 E, 60 L, 354/50, 51, 60 R

[56] References Cited

U.S. PATENT DOCUMENTS

| Re. 29,615 | 4/1978 | Toyoda | 354/60 E |
| 3,696,721 | 10/1972 | Wagner | 354/60 L X |
| 4,199,236 | 4/1980 | Goto et al. | 354/60 L X |

*Primary Examiner*—Michael L. Gellner
*Attorney, Agent, or Firm*—Fitzpatrick, Cella, Harper & Scinto

[57] ABSTRACT

There is disclosed an alarm device for an automatic exposure control device for a camera wherein the output of a circuit for setting shutter speed or aperture value to a predetermined value during use of a strobe is utilized as the standard level of the alarm device to effect an alarm of shutter speed or aperture value, the circuit being of simple construction and highly accurate.

3 Claims, 1 Drawing Figure

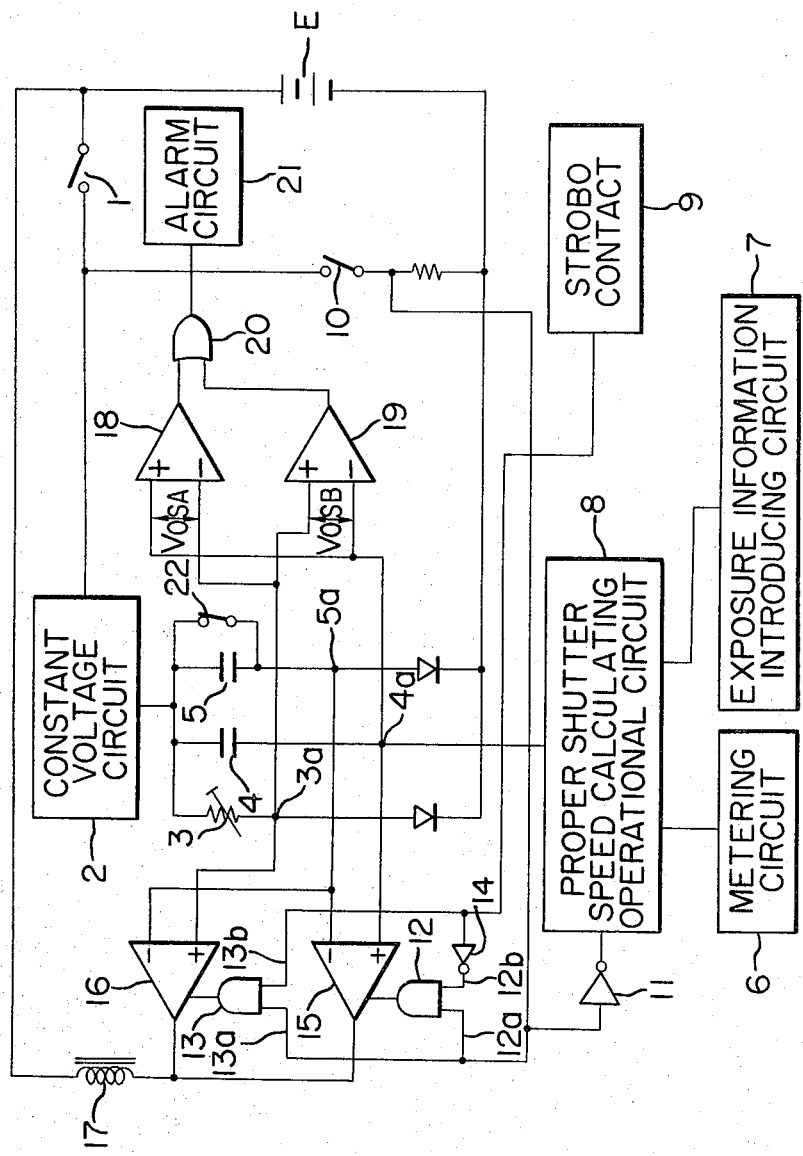

4,316,660

ALARM DEVICE IN AN AUTOMATIC EXPOSURE CAMERA

BACKGROUND OF THE INVENTION

1. Field of the Invention

This invention relates to an alarm device in an automatic exposure control camera.

2. Description of the Prior Art

In an automatic exposure control camera, for example, a camera in which automatic exposure control is effected by an electric shutter, there is known an alarm device which generates an alarm when the proper shutter speed is outside of the operation range of the electric shutter or when the proper shutter speed is so low that hand vibration may be caused (U.S. Pat. No. 3,975,747).

Also, in an automatic exposure camera of the aperture control type, there is known an alarm device which warns that a proper exposure cannot be obtained when the proper aperture value exceeds the maximum value or the minimum value of the aperture.

These have been carried out by comparing the output of a proper exposure calculating circuit representing a proper shutter speed or a proper aperture value with a standard level. However, the manufacture of such an alarm device has involved the necessity of adjusting said standard level, which in turn has resulted in complication of the circuit construction.

SUMMARY OF THE INVENTION

It is the object of the present invention to make unnecessary the standard level only for such alarm device and to provide an alarm device which is simple in circuit construction.

The alarm device of the present invention is constructed so that, during the use of a strobo, the output of a circuit for setting the shutter speed or the aperture value to a predetermined value or an output associated with the output of said circuit is used as the standard level.

The invention will become fully apparent from the following detailed description thereof taken in conjunction with the accompanying drawing.

BRIEF DESCRIPTION OF THE DRAWING

The drawing is a circuit diagram of an embodiment of the present invention.

DESCRIPTION OF THE PREFERRED EMBODIMENTS

An embodiment of the present invention applied to an automatic exposure camera of the electric shutter control type will hereinafter be described with reference to the drawing.

In the drawing, a main switch 1 is used to connect a power source E to a constant voltage circuit 2. The constant voltage circuit 2 is connected to an adjust resistor 3, a memory capacitor 4 and a shutter time determining timer capacitor 5. The adjust resistor 3 generates at its output terminal 3a a predetermined voltage representing a synchronized shutter speed synchronizable with flashing of the strobo, for example, 1/90 second. A metering circuit 6 generates an output corresponding to the object brightness, and an exposure information introducing circuit 7 generates an output corresponding to a set ASA value and a set aperture value. A proper shutter speed calculating operational circuit 8 calculates a proper shutter speed value from each of the outputs of the circuits 6 and 7. The memory capacitor 4 is charged to a voltage corresponding to the output of the operational circuit 8. A strobo contact 9 is electrically connected to a strobo when the strobo is mounted on a camera, and a high level voltage is applied from the strobo side when the main switch of the strobo is closed. A memory switch 10 is closed by depression of a shutter button, whereby a high level voltage is applied from the power source E to an inverter 11 and one input terminal 12a, 13a of each of AND gates 12 and 13. By the application of this high level voltage, the inverter 11 switches off the output of the operational circuit 8. Thereby, the memory capacitor 4 memorizes the output of the operational circuit 8 immediately before the closing of the memory switch 10. The other terminal 12b of the AND gate 12 is connected to the strobo contact 9 through an inverter 14, and the other terminal 13b of the AND gate 13 is directly connected to the strobo contact 9. Accordingly, the AND gate 12 generates a high level output to render a comparator 15 operative only when the memory switch 10 is closed and the strobo is not mounted (strictly, the main switch of the strobo is open—this holes true hereinafter). Also, the AND gate 13 generates a high level output to render a comparator 16 operative only when the memory switch 10 is closed and the strobo is mounted (strictly, the main switch of the strobo is closed—this holds true hereinafter). A magnet 17 controls the closing time of the shutter. A comparator 18 compares the voltage of the operational circuit 8 representing the proper shutter speed with the voltage of the adjust resistor 3 representing the synchronized shutter speed and generates a high level output when the proper shutter speed output is greater than the highest controllable speed of the electric shutter. Specifically, the offset voltage $V_{OSA}$ of the differential input of the comparator 18 is determined as the difference between the voltage of the synchronized shutter speed and the voltage of the highest speed of the shutter. A comparator 19 also compares the output of the operational circuit 8 with the voltage of the adjust resistor 3 representing the synchronized shutter speed and generates a high level output when the proper shutter speed is slower than the limit speed whereat hand vibration is likely to occur, for example, 1/30 second. Specifically, the offset voltage $V_{OSB}$ of the differential input of the comparator 19 is determined as the difference between the voltage of the synchronized shutter speed and the voltage of the shutter speed which is the limit of the hand vibration. An alarm circuit 21 effects visual or aural alarm through an OR gate 20 when one of the outputs of the comparators 18 and 19 is at high level.

The operation of such construction will hereinafter be described. When the strobo is not mounted on the camera, the potential of the contact 9 is at low level. In this case, when the memory switch 10 is closed by depression of the shutter button, the AND gate 12 generates a high level output to render the comparator 15 operative. On the other hand, the comparator 16 is non-operative due to the low level potential of the contact 9. At this time, a trigger switch 22 parallel to the timer capacitor 5 is closed and the potential of the output 5a of the timer capacitor 5 is so high that the comparator 15 generates a low level output. Thereby, the magnet 17 is electrically energized to prevent the closing operation of the shutter. Thereafter, when the shutter is opened and the trigger switch 22 is opened in synchronism therewith, the potential 5a of the timer capacitor 5 drops. When that potential assumes the potential of the proper shutter speed memorized in the memory capacitor 4, the comparator 15 generates a high level output to deenergize the magnet 17 and close the shutter. In this manner, control of the proper exposure time is effected.

On the other hand, when the strobo is mounted on the camera, the contact 9 assumes a high level potential, so that by the closing of the memory switch 10, the AND gate 12 generates a low level output while the AND gate 13 generates a high level output. Accordingly, the comparator 15 becomes inoperative and the comparator 16 becomes operative. The comparator 16 generates a low level output when the trigger switch 22 is closed and therefore, the magnet 17 is electrically energized to prevent the shutter closing operation. When the shutter is opened and the potential 5a of the timer capacitor 5 drops to the voltage 3a of the synchronized shutter speed, the comparator generates a high level output to deenergize the magnet 17 and close the shutter. Thus, when the strobo is mounted on the camera, the shutter is automatically controlled to the synchronized shutter speed set by the adjust resistor 3.

On the other hand, when the proper shutter speed of the operational circuit 8 is faster than the aforementioned highest speed of the shutter, the output of the operational circuit 8 becomes higher than the synchronized shutter speed potential 3a plus the offset voltage $V_{OSA}$ of the comparator 18, so that the comparator 18 generates a high level output. Accordingly, the alarm circuit 21 generates an alarm. Also, when the proper shutter speed output of the operational circuit 8 is slower than the aforementioned hand vibration limit speed, the output of the operational circuit 8 becomes lower than the synchronized shutter speed potential 3a minus the offset voltage $V_{OSB}$ of the comparator 19, so that the comparator 19 generates high level output. Accordingly, the alarm circuit 21 generates an alarm.

The output potential 3a of the resistor 3 representing the synchronized shutter speed is thus used as the standard voltages of the comparators 18 and 19 which control the alarm circuit 21 and therefore, a circuit for producing an exclusive standard voltage becomes unnecessary.

In the above-described embodiment, the offset voltages of the differential inputs of the comparators 18 and 19 are selected so as to correspond to the difference between the synchronized shutter speed and the highest shutter speed and the difference between the synchronized shutter speed and the hand vibration limit shutter speed, respectively, whereas instead of selecting the offset voltages as described above, the highest shutter speed output and the hand vibration limit shutter speed output may be produced from the synchronized shutter speed output and these may be applied to the comparators 18 and 19, respectively, or alternatively, a voltage having a value of the proper shutter speed output minus the aforementioned offset voltage $V_{OSA}$ and a voltage having a value of the proper shutter speed output plus the aforementioned offset voltage $V_{OSB}$ may be produced and these may be applied to the comparators 18 and 19, respectively.

As will be apparent from what has been described above, according to the present invention, the output of the circuit for setting the shutter speed or the aperture value to a predetermined value during the use of the strobo is utilized as the standard level of the alarm device to effect alarm of the shutter speed or alarm of the aperture value and this leads to very high accuracy and great simplicity of the circuit construction of the alarm device.

We claim:

1. An alarm device provided in a camera including means for selecting exposure time in response to the brightness of an object to be photographed, a device for controlling exposure according to the selected exposure time, and means for setting a reference exposure time suitable for flash photography, the alarm device producing alarm when said selected exposure time is beyond a predetermined range, the improvement comprising:
(a) first comparing means which produces an output when a value subtracting a reference exposure time from said selected exposure time is greater than a difference between said reference exposure time and a maximum exposure time within said predetermined range;
(b) second comparing means which produces an output when a value subtracting said selected exposure time from said reference exposure time is greater than a difference between said reference exposure time and a minimum exposure time within said predetermined range; and
(c) alarm means operable on receipt of a least one of the outputs of said first comparing means and the output of said second comparing means.

2. The alarm device according to claim 1, wherein said first comparing means has as input electric signals of said selected exposure time and of said reference exposure time and includes a circuit for comparing the difference of said electric signals with respect to an electric level corresponding to the difference between said reference exposure time and said maximum exposure time, while said second comparing means has as input electric signals of said selected exposure time and of said reference exposure time and includes a circuit for comparing the difference of said electric signals with respect to an electric level corresponding to the difference between said reference exposure time and said minimum exposure time.

3. The alarm device according to claim 1, wherein said first comparing means has an input electric signals of said selected exposure time and of said reference exposure time and includes a circuit for shifting a level of any one of said electric signals in correspondence with the difference between said reference exposure time and said maximum exposure time to compare to each other, while said second comparing means has as input electric signals of said selected exposure time and said reference exposure time and includes a circuit for shifting a level of any one of said electric signals in correspondence with the difference between said reference time and said minimum exposure time to compare to each other.

* * * * *